(12) United States Patent
Gießibl

(10) Patent No.: US 11,561,141 B2
(45) Date of Patent: Jan. 24, 2023

(54) METHOD FOR MEASURING A TORQUE APPLIED TO A MAGNETOELASTIC BODY

(71) Applicant: Methode Electronics Malta Ltd., Birkirkara (MT)

(72) Inventor: Johannes Gießibl, Amerang (DE)

(73) Assignee: Methode Electronics Malta Ltd., Birkirkara (MT)

( * ) Notice: Subject to any disclaimer, the term of this patent is extended or adjusted under 35 U.S.C. 154(b) by 114 days.

(21) Appl. No.: 16/994,863

(22) Filed: Aug. 17, 2020

(65) Prior Publication Data

US 2021/0055174 A1 Feb. 25, 2021

(30) Foreign Application Priority Data

Aug. 20, 2019 (DE) ...................... 10 2019 005 859.3

(51) Int. Cl.
*G01L 3/00* (2006.01)
*G01L 3/10* (2006.01)

(52) U.S. Cl.
CPC .................... *G01L 3/102* (2013.01)

(58) Field of Classification Search
CPC ....................................... G01L 3/102
See application file for complete search history.

(56) References Cited

U.S. PATENT DOCUMENTS

| | | | | |
|---|---|---|---|---|
| 4,506,554 A * | 3/1985 | Blomkvist | ............ | G01L 3/105 73/862.334 |
| 5,591,925 A * | 1/1997 | Garshelis | ............ | G01L 3/102 324/207.13 |
| 9,435,708 B1 * | 9/2016 | Kari | ............ | G01L 25/003 |
| 2008/0257069 A1 | 10/2008 | Poirier et al. | | |
| 2009/0249893 A1 * | 10/2009 | Ling | ............ | G01L 3/102 427/130 |
| 2013/0125669 A1 | 5/2013 | Barraco et al. | | |
| 2016/0238472 A1 * | 8/2016 | Gießibl | ............ | G01R 33/1207 |
| 2017/0102279 A1 * | 4/2017 | Gießibl | ............ | G01L 3/104 |
| 2017/0356822 A1 * | 12/2017 | Gießibl | ............ | G01L 3/105 |

FOREIGN PATENT DOCUMENTS

| | | | | |
|---|---|---|---|---|
| DE | 202015105087 U1 | 12/2015 | | |
| DE | 102016119094 A1 | 4/2017 | | |
| DE | 102019112795 A1 * | 11/2020 | ............ | C22C 19/00 |
| JP | H02-128129 A | 5/1990 | | |
| JP | 2013-137302 A | 7/2013 | | |

* cited by examiner

*Primary Examiner* — Max H Noori
(74) *Attorney, Agent, or Firm* — Thompson Coburn LLP

(57) ABSTRACT

A method for measuring stress applied to a magnetoelastic body, simultaneously detecting a potential external magnetic field affecting a magnetoelastic sensor and allocating a non-stress related influence affected by the field on the body, including applying at least two opposite magnetic zones on the body, providing at least one sensor including at least one first (1) and second (2) channel having at least two axially aligned coils each, arranged adjacent to the magnetized zone of the body, both channels having different sensitivity relative to the field, setting-up channel 1 as a common mode rejection channel and channel 2 as a common mode acceptance channel, reading the magnetized zones when stress is applied to the body, measuring the stress by channel 1 leading to an opposite sensitive direction, and detecting the impact of the field to the magnetized zones by channel 2 leading to an identical sensitive direction.

4 Claims, 4 Drawing Sheets

METHOD FOR MEASURING A TORQUE APPLIED TO A MAGNETOELASTIC BODY

RELATED APPLICATION DATA

This application claims the benefit of German patent application ser. no. DE 10 2019 005 859.3 filed on Aug. 20, 2019, the disclosure of which is incorporated by reference herein.

DESCRIPTION

The description that follows refers to a method for measuring a stress applied to a magnetoelastic body and for simultaneously detecting a potential external magnetic field affecting the magnetoelastic sensing capabilities. Also, the method serves to allocate a non-stress related influence affected by the potential external magnetic field on the magnetoelastic sensing capability.

The description that follows further refers to a sensor for measuring a stress applied to a magnetoelastic body and for simultaneously detecting a potential external magnetic field affecting the magnetoelastic sensing capabilities of the sensor.

BACKGROUND

Magnetoelastic sensors are well known in the state of the art. This non-contact sensor technology utilizes fundamental mechanical and magnetic properties of the material to measure different process parameters. The process involves measuring changes in the properties of remanent magnetic fields as the mechanical characteristics change, such as shear stress, as external forces are applied onto the sensor host. The technology is applied by directly magnetizing a mechanical member instead of attaching additional elements, such as a ring or strain gauges. Highly sensitive fluxgate sensors located in close proximity to the magnetized member sense the change in the magnetic-field characteristics that are proportional to the applied force. These changes are linear and repeatable within the elastic limit of the material, and are accurate under normal and extended operating conditions.

Specific embodiments of this technology utilize a so-called Dual-Band magnetization. It comprises a magnetoelastic body using two magnetic zones. The term "magnetic zone" and the term "magnetic band" as well as "magnetic track" are often used as synonyms; this is done also here. The magnetic zones are being magnetized by applying processes well known, too.

The magnetization of said two magnetic zones is each directed opposite to the other. Said two magnetic zones form a so-called Dual-Band configuration. One or more sensor(s) utilizing a number of coils is/are assigned to said zones.

A specific configuration of this technology is described in the U.S. Pat. No. 8,893,562 B2, which reveals a torque sensing device for measuring the torque which is applied to a rotatable shaft. The torque sensing device also measures the magnetic field noise, e.g. external magnetic fields, affecting said device. The device is capable to operate in a common mode acceptance and in a differential mode which is the noise cancellation mode. The device is characterized by comprising a switching circuit, by which operation of the magnetic field sensors may be switched from common mode acceptance to differential mode and vice versa. Thus, the switching function enables the device to also operate in a differential noise rejection mode as well as in a common acceptance mode for determining the torque applied to the rotatable shaft. Said determination is based on output signals which are obtained from magnetic field sensors. The sensor has one pair of sensing coils. By switching, said sensor is capable of operating in both the common mode acceptance and the common rejection mode. Said device is capable of accurately measuring a torque induced magnetic field. Also, the device is capable of canceling measurement errors resulting from noise induced magnetic fields.

Although this state of the art improved the magnetoelastic sensor technology of the time, there are some effects to be improved as discussed shortly below:

A drawback of the state of the art lies in that the known methods require complex mathematical equations to compensate external magnetic fields.

The method known from the state of the art measures the amount of torque applied to a torque sensing device including the steps of providing a magnetoelastic torque to a magnetic field transducer. It is important here that the transducer has a first magnetically conditioned region and a second, oppositely polarized magnetically conditioned region.

Thereby a first magnetic field sensor is positioned adjacent to the first magnetically conditioned region, wherein the first magnetic field sensor has a sensitive direction.

A second magnetic field sensor is positioned proximate to the second magnetically conditioned region, wherein the second magnetic field sensor has a sensitive direction.

Setting the first and the second magnetic field sensors in a first connection state, said sensitive directions of the first and the second magnetic field sensors are arranged opposite to each other. Thus, first output signals are received from each of the first and the second magnetic field sensors in the first connection state. (Common mode rejection, also referred to as differential mode. In the following, it is referred to as Common mode rejection.).

The above mentioned switching function reconfigures said first and said second magnetic field sensors into a second connection state, whereby the sensitive direction of the first and the second magnetic field sensors are identical. (Common mode acceptance).

In the second connection state second output signals are received from each of the first and the second magnetic field sensor.

The stress applied to the rotatable shaft is measured based on the first and the second output signals.

This complex method leads to the drawback that the methods requires a transition from a common mode acceptance to a common mode rejection. Said transition is achieved by switching the sensitive direction of a coil from a common mode acceptance to common mode rejection.

There are switches to facilitate the transition from common mode acceptance to common mode rejection. Upon the activation, said switches effectively reverse the sensitive direction of a coil. This serves to ensure a proper functionality of the stress sensing device.

The conduct of the switching needs time; after the switching only one obtains a reliable reading result again. Although the switching period may be a fraction of a second only, this means that in this period of time for switching the entire method and device cannot deliver any results, i.e. the method and the device are metaphorically speaking "blind". Thus, said channel 1 and related coils are completely "blind" when the sensor system is switched from said common mode acceptance to common mode rejection use, vice versa. Information which could have been gathered in this period of time is gone definitively lost.

The methods for measuring a stress applied to magnetoelastic body known from the state of the art commonly use multiple individual magnetic field sensors. Said sensors are relevant for measuring stress induced signals.

In addition, said known method for measuring a stress use multiplexing of the coils and switching between said common mode acceptance and said common mode rejection. Multiplexing of the sensor coils however makes the sensor systems relatively slow from a signal bandwidth point of view.

One further effect of the state of the art with regard to eliminating magnetic influences is that by conducting this elimination process quasi automatically also the sensitivity on the stress measurement is reduced to a high value, making the entire method and device often fairly inaccurate.

Another technical approach is used DE 10 2015 122 154 B4, which discloses a device for the detection of an external magnetic field and/or a product-related magnetic field on a ferromagnetic component which is magnetized in the form of magnetic tracks. An apparatus is provided for detecting an external magnetic field and/or a product-related magnetic field on a ferromagnetic component, which has a magnetization in the form of magnetic tracks. The apparatus comprises at least two magnetic field sensors which can detect an external magnetic field acting on the ferromagnetic component. Each magnetic field sensor comprises two coils, wherein each coil is assigned at least one magnetic track. Each two coils are configured so that they have a different sensitivity to one another, wherein one coil which has a higher sensitivity with respect to the other coil. The coil having the higher sensitivity ensures that the effect of an external magnetic field is amplified. The DE 10 2015 122 154 B4 reveals a so-called Dual-Dual-Band configuration utilizing an arrangement of the ferromagnetic component with three magnetic tracks is assumed hereinafter. The three magnetic tracks each directed oppositely to one another are detected according to the invention axially to a ferromagnetic component of four magnetic coils in each case, of which respectively two are assigned to one (first and second) magnetic field sensor (dual-dual-band magnetization). One magnetic coil of two magnetic field sensors thus detects at least one magnetic track, namely usually the central one in the case of three magnetic tracks directed oppositely to each other, of which the adjacent oppositely directed ones are magnetized. The magnetic field sensors or magnetic coils are arranged at a distance from one another and radially to the ferromagnetic component. The dual-dual-band sensor arrangement is used for better and differentiated evaluation of an actual state or possible deviations, e.g. as a result of faults and defects, of the product to be tested because at least two comparative quantities are obtained by this means which can be detected from the respective voltage of at least two magnetic tracks by a magnetic field sensor and the voltage of at least two magnetic tracks by another magnetic field sensor. Furthermore, as a result of the spatially narrow arrangement of the magnetic tracks it is possible that the external magnetic field differences between the positions of the magnetic track channels are as small as possible. The combination of said Dual-Band zones is achieved by axially displacing the second Dual-Band arrangement and using the central zone jointly.

This Dual-Dual-Band configuration is a highly accurate system which delivers perfect and reliable results in all relevant situations. A certain drawback under certain circumstances when space is tight, might be, however, that it needs at least three magnetic zones of opposite magnetic orientation adjacent to each other.

SUMMARY

It is, thus, an object of the present disclosure to avoid said drawbacks and deficiencies referred to above.

One goal of the present disclosure is to create a method and device, which are as exact and reliable as the above mentioned Dual-Dual-Band technology, but which are more appropriate for use in confined spaces.

It is an object of the disclosure of avoiding a situation of temporary "blindness" when conducting a method of measuring and detecting the existence and effect of an external magnetic field as well as of stress and/or stress applied to a magnetoelastic body. Under the influence of an external magnetic field, modern applications for measuring torque and/or stress often indicate torque and/or stress, even though there is no torque or stress applied to the magnetoelastic body which is sensed. This may be due to the fact, that at least to a certain extent, the sensor for measuring torque or stress reacts to a present external magnetic field. Thus, such—in many cases—unintentional influence of an external magnetic field to a torque resp. stress sensing device may negatively influence the components which are connected to this magnetoelastic body and its sensed magnetoelastic condition.

Further on, it is an intention of the present disclosure to provide such a method and/or device, which fulfills safety integrity level specifications. Such safety integrity level specifications are of importance in various economic and or technical applications, e.g. aerospace, automotive and other. These specific applications require extremely fast and exact measurements of torque and/or stress and external magnetic influences. They also need to achieve a certain degree with at least a certain possibility to detect false signals or wrong signal behavior.

In addition, the present disclosure aims at providing a method and a device, which is simple, cost effective on the one hand, and nevertheless highly accurate in the other hand. The areas for use of this invention guarantee the most varied applications. By way of an example and not in any limiting sense, the principles of the disclosure may be implemented into the power unit of an electrified bike (a "pedelec"). This implementation requires a lightweight, slim and space-saving design.

In many cases, a torque or stress is applied to a magnetized body, the magnitude of said torque is then being sensed by a sensor.

In the example of a pedelec, the magnetized body could be a shaft arranged inside a powertrain of the pedelec.

The present disclosure avoids the above mentioned negative conditions according to which an external magnetic field influences the results of measuring torque and/or stress by wrongly indicating the existence or dimension of torque or stress, even though there is or was no or less torque or stress applied to the magnetoelastic body which is sensed. Thus, the present disclosure assists in avoiding incorrect conclusions in case of—in many cases—an unintentional influence of an external magnetic field to a torque resp. stress sensing device and, thereby avoiding a negative influence of these results on components, which are connected to this magnetoelastic body and its sensed magnetoelastic condition.

The technology of the disclosure need narrow spaces only and being nevertheless highly accurate and reliable.

It will be described that it is an advantage of the present disclosure that there is no need of a third or further magnetized track on the magnetoelastic body anymore which allows a shrinking of the size of the entire sensor.

Thus, the size of the sensor can be successfully reduced by just utilizing two magnetic zones on the magnetoelastic body. The device works perfectly utilizing a two-band configuration only, i.e. a configuration which needs less space, less electronics and less complexity. Needless to say that adding one or more magnetic tracks would not negatively influence the device, the principles of the disclosure work also in such a case.

The magnetoelastic effect which occurs due to torque and/or stress in the magnetoelastic body results in a difference compared to the condition when no torque and/or stress is applied to the body, which is expressed in a magnetic field variation, and which shows the influence of the torque respectively stress applied to the magnetoelastic body, whereby the situation is measured by the magnetic field sensor.

As already indicated above, the method and the device according to the disclosure is/are meant for the detection and the allocation of a non-torque related influence affected by a potential external magnetic field on the magnetoelastic sensor.

According to the disclosure, the results of the detected external magnetic field are allocated to the results of the measured stress. Also, a threshold is defined to predetermine whether a certain result of the measured stress is to be attributed to the external magnetic field. The threshold may also be referred to as a borderline or a level to determine the relevance of the external magnetic field.

Any applicant of this technology may fix his/her own, for instance, empirically evaluated borderline(s) or level(s) to determine the relevance of the external magnetic field influencing the result of the measurement of torque and/or stress applied—or even not applied—to the magnetoelastic body. Defining this allocation of the results of an detected external magnetic field to the results of an measured torque and/or stress and defining this/these borderline(s) or level(s), the applicant of this technology, e.g. the manufacturer of a pedelec, can predetermine whether a certain result of the detected external magnetic field ought to be attributed to the torque and/or stress applied to the magnetoelastic body or ought to be attributed to the non-stress factor of an external magnetic field.

Therefore, according to the present invention a method is conducted and a device provided comprising a sensor, which is capable of allocating the existence and effect of an external magnetic field on a simultaneous measurement of torque and/or stress with regard to a magnetoelastic body. Particularly, according to the disclosure, the results of the detection of the existence of an external magnetic field are correlated to the results of the simultaneous measurement of the existence or non-existence of torque and/or stress applied to the magnetoelastic body.

Even more particularly, the disclosure provides to the user of the device and applicant of the method the possibility to allocate a threshold according to which specific exceeding or short falling results of measuring and detecting the existence and the effect of an external magnetic field as well as of torque and/or stress applied to a magnetoelastic body may be individualized, incorporated or excluded for further steps according to the needs in the specific field of use.

Since the expressions "stress" and "torque" will be used as synonyms for the purposes of the description that follows, the expression "stress" will be used as "pars pro toto", i.e. including the meaning of the expression "torque", or vice versa.

The method for measuring a stress and for detecting a potential external magnetic field affecting the magnetoelastic body may comprise any one and all of the steps of:
  applying at least two magnetic zones of opposite magnetic orientation to each other on the magnetoelastic sensor, and
  providing at least one sensor which comprises at least one first channel 1 and one second channel 2, wherein
    the first channel 1 and the second channel 2 comprise at least two coils each, both coils being axially aligned,
    the at least two coils each being arranged adjacent to the magnetized zone of the magnetoelastic body,
    both channels 1 and 2 having a different sensitivity,
  setting up the first channel 1 as a common mode rejection channel 1 and,
  setting up the second channel 2 as a common mode acceptance channel,
  reading said magnetized zones when stress is applied to the magnetoelastic body,
  measuring the stress applied to the magnetized zones of the magnetoelastic body by the first channel 1 relative to an electric current flowing through the at least two coils of the first channel 1 in an opposite direction to a center tap CT, and leading to an opposite sensitive direction, (Common mode rejection)
  detecting the impact of the external magnetic field to the magnetized zones of the magnetoelastic body essentially by the second channel 2 relative to an electric current flowing through the at least two coils of the second channel 2 in an identical direction to the center tap CT, and leading to an identical sensitive direction, (Common mode acceptance)
  providing a gain difference wherein the sensitivity of the individual channel 1, 2 is increased by the same amount or by a different amount.

The sensor for measuring a stress applied to a magnetoelastic body and for simultaneously detecting a potential external magnetic field affecting the magnetoelastic sensor and for allocating of a non-stress related influence affected by the potential external magnetic field on the magnetoelastic sensor, may include any and all of the following:
  the sensor being constructed in a way that it is capable to interact with the magnetoelastic body having at least two magnetic zones of opposite magnetic orientation to each other,
  the sensor comprising at least one first channel 1 and one second channel 2
    whereby the channel 1 and the channel 2 comprise at least two coils each, both coils being axially aligned
    whereby the at least two coils are constructed each in a way that they can be arranged adjacent to the magnetized zone of the magnetoelastic body
    whereby both channels 1, 2 being constructed in a way that they have a different sensitivity,
    whereby the first channel 1 is set up as a common mode rejection channel 1 and
    whereby the second channel 2 is set up as a common mode acceptance channel
    whereby the first channel 1 and the second channel 2 are constructed in a way to be capable to read said magnetized zones of the magnetoelastic body when stress is applied to the magnetoelastic body and the external magnetic field affects the magnetoelastic sensor
    whereby the first channel 1 is constructed in a way to be capable of measuring the stress applied to the magnetized zones of the magnetoelastic body relative to an electric current flowing through the at least two coils of the first channel 1 in an opposite direction to a center tap (CT), and leading to an opposite sensitive direction, whereby the second channel 2 is constructed in a way to be capable to detect the effect of the external magnetic field to the channel 1 relative to an electric current flowing through the at least two coils of the second channel 2 in an identical direction to the central tap (CT), and leading to an identical sensitive direction, Preferably the sensor is capable of providing a gain difference wherein the sensitivity of the individual channels (1,2) is increased by the same amount or by a different amount.

In the following discussion, the relevant components and features needed for conducting the method and providing the sensor will be explained.

Sensor

The sensor may be a magnetic field sensor. Hence, the sensor is also referred to as magnetic field sensor.

The sensor may comprise at least two channels 1,2. Each channel 1,2 has at least two coils.

The sensor further comprises at least drives A, B. Said drives A, B represent the wiring, connecting said coils with the channels 1, 2 and at least two center taps (CT) one for each channel. Drive A serves connecting at least the corresponding coils with said center tap (CT) of the channels 1 and 2. Drive B serves connecting at least the corresponding coils with said center tap (CT) of the channel 2.

The sensor has means for measuring the current flowing from the Drive A to Drive B across the center tap (CT) of the individual Channels, —or vice versa—, whereby the current is flowing from the drives to the center tap (CT).

The sensor also utilizes at least two magnetic tracks applied to the magnetoelastic body and measures the stress applied to the magnetoelastic body.

To flip the polarity of the coil to reverse the direction of the flow of the current within the coil, the center tap CT needs to be adapted to the amended direction of the flow of the current. Thus, when the flow of the current in the relevant coil is reversed the measurement direction in the individual coil is reversed as well.

Torque Respectively Stress

In the description that follows, the term "torque" refers to the force applied via a momentum onto an object, such as a magnetoelastic body. The "torque" is a specific embodiment of "stress" applied to the magnetoelastic body.

The expressions torque and stress are used as synonyms. In the following discussion, the expression "stress" is used for both manifestations.

Magnetoelastic Body

A magnetoelastic body is any appropriate embodiment, which is able to receive stress. It may be constructed as a shaft, a cylinder or any appropriate geometric configuration. It may be rotatable.

It may comprise at least one magnetoelastic active region, which allows the body to receive a magnetoelastic-relevant stress. The magnetoelastic region may be an integral and homogeneous part of the body. Thus it is subject to a magnetoelastic effect. Said magnetoelastic effect comprises the interaction between both a mechanical stress and a mechanical strain.

External Magnetic Field

External magnetic fields are referred to as magnetic fields which are not product-related i.e. torque or stress related.

The product related magnetic field can be created by applying stress to the magnetoelastic body. External magnetic fields may be caused by defects, interference effects or other influences on a magnetoelastic sensor. External magnetic fields may originate from environmental influences such as, for example, power lines, rail lines, earth magnetic field or else. Such external magnetic fields may have an influence on the detection and measuring of a "product-related" magnetic field. This influence is described by the expressions "affect", "effect" and/or "impact" being used as synonyms. Said external magnetic fields can influence magnetic field sensors which are primarily intended to measure product-related magnetic fields being of product-related origin.

Coils and Channels

According to the disclosure, there is at least one sensor for measuring a stress applied to a magnetoelastic body and for simultaneously detecting a potential external magnetic field. Said sensor comprises at least one first channel 1 and one second channel 2. The channel 1 of the sensor is the relevant one for measuring the effect of stress applied to the magnetoelastic body. To some extent the channel 1 detects an effect of an external magnetic field to the magnetoelastic sensor. The channel 2 of the sensor only detects the effect of the external magnetic field to the magnetoelastic body. The channel 2 does not measure any stress related fields from the magnetoelastic body.

Both channels 1 and 2 comprise at least two coils each.

Each magnetic zone of the magnetoelastic body, described above, is assigned at least one coil of the sensor.

Since there are at least two magnetic zones, at least two coils are provided per channel 1, 2 of the sensor. Each of them being assigned to its corresponding magnetic zone.

In the area of the magnetic zones corresponding coils of said channel 1 and said channel 2 are arranged radially spaced from said magnetoelastic body.

Said coils are preferably arranged circumferentially around the magnetoelastic body.

Thus, in a front view of the coil position the coils of channel 1 are arranged in a position which is behind the position of the coils of channel 2 or vice versa.

To increase the sensitivity of the channel 1 and the sensitivity of the channel 2 at least two coils representing the channel 1 or the channel 2 are arranged next to each other, tangentially spaced to the magnetoelastic body.

The sensor can be constructed as one-point sensor, two-point sensor or multiple-point sensor. By way of example, a one-point sensor can be positioned relative to the magnetoelastic body. The one-point sensor has two coils (one coil pair) per channel 1, 2. Hence, at least four coils are used. In case of a two-point sensor, there are two coil pairs per channel 1, 2; here, at least four coils are used. Also, a four-point sensor can be arranged relative to the magnetoelastic body; thus, two channels 1, 2 each are positioned both in the 12° clock position and in the 3° clock position and in the 6° clock position and in the 9° clock position, i.e. in this configuration 16 coils are used.

The arrangement of the coils of said various channels 1, 2 results in the emission of a specific signal per coil of each channel 1, 2.

Said signals are further processed by the above mentioned channel 1 and channel 2; the way this is being achieved will be described in more detail below.

According to the two sets of magnetic zone-related information, the first channel 1 evaluates a first signal. Likewise the second channel 2 evaluates a second signal. Both signals are being compared and allocated to one another. The coils of the one channel 1 are connected in a so-called common mode rejection; the coils of the other channel 2 are connected in a so-called common mode acceptance. Details of the configuration will be explained in more detail below.

Common Mode Rejection and Common Mode Acceptance

This means that the method employs a Dual-Band system, of which the magnetic zones are read with at least one channel, configured in common mode rejection. The at least one other channel is set in common mode acceptance.

The common mode rejection and the common mode acceptance are described in the above mentioned patent document U.S. Pat. No. 9,893,562 B2. These modes may be summarized as follows. Both of the modes describe an electrical connection state.

In the common mode rejection the at least two coils of the one channel 1 of the sensor are connected in a configuration such that the same excitation sine wave through each of the coils of the respective channel 1 coincides with oppositely polarized magnetic fields.

To have the coils of the channels 1 and 2, respectively detect the external magnetic field in the common mode rejection, the coils can be connected according to a so-called "axial chain" or a "ring chain". Thus, a so-called rejection mode arrangement of the coils is achieved.

In the common mode acceptance the at least two coils of the channel 2 of the sensor are connected in a configuration such that the same excitation sine wave through each of the coils will coincide with identically polarized magnetic fields.

The coils of the channel 1 are connected to each other in a way that the channel 1 measures the torque applied to the magnetoelastic body. To do so, the channel 1 is set in the common mode rejection. To a certain extent, however, the coils of the channel 1 also react to the present external magnetic field.

In theory, when torque is applied to the magnetoelastic body without any external magnetic field being present, the channel 1 shows a reaction i.e. the channel 1 shows a reaction. However, since—in theory—there is no present external magnetic field, the channel 2, detecting the external magnetic field does not show any reaction.

Sensing a present external magnetic field—at least to a certain extent—the channel 1 "erroneously" perceives the present external magnetic field as an additional amount of stress being applied to the magnetoelastic body, even though there is actually no stress or less stress being applied to said magnetoelastic body.

In other words, the channel 1 of the sensor, responsible for sensing the stress being applied to said magnetoelastic body, to a certain extend is affected by the presence of the external magnetic field. Thus, the presence of the external magnetic field leads the channel 1 of the sensor to "erroneously" show a magnitude of stress, even though there is no or less stress being applied to said magnetoelastic body. Thus, the signal emitted by the channel 1 of the sensor is distorted by the presence of the external magnetic field.

The coils of the channel 2 are connected to each other in a way that the channel 2 detects the presence of the external magnetic field relative to the magnetoelastic body. To do so, the channel 2 is set in the common mode acceptance. The coils of the channel 2 also show the magnitude of the present external magnetic field.

As said above, to a certain extent, however, the coils of the channel 1 also react to the present external magnetic field.

The coils of the channel 2 are connected to each other in a way that external magnetic fields are being detected whereas the influence of the stress applied is cancelled out. This means in case external magnetic field is being detected the effect of its detection is that the instrument resp. its graph, which is used to make the results of the detection visible, shows a reaction for the channel 2, whereas there is a reduced reaction for the channel 1.

The description of the two previously mentioned paragraphs refers to an ideal situation which is not necessarily given in reality but which expresses the principal difference already mentioned that the coils of channel 1 measure stress mainly and detect to some extent the external magnetic field, whereas the coils of the channel 2 detect the external magnetic field only. So both channels 1 and 2 have a different sensitivity relative to the external magnetic field.

The channel 1 indicates the sensed external magnetic field as an additional magnitude of stress. Depending on the magnitude of the signal provided by the channel 2 as result of the detected external magnetic field, the applicant of this technology—who is normally not the end user—will be able to allocate the indication of the additional magnitude shown as signal of channel 1 correctly to the factor of the external magnetic field and, thus, avoiding an allocation to a stress factor by error.

How this allocation is done, depends on the field in which this technology is used. Empirical factors as well as technical or other factors for applying this allocation may be used. This makes the technology usable for many different technical, commercial fields.

Gain Difference

When comparing the results of the measuring and the detecting steps of the channel 1 and the channel 2 a gain differences becomes evident and has to be identified.

The term "gain difference" refers to a choice of a different gain setting which becomes necessary because the one channel 1 and the one channel 2 each react significantly different in respect of the sensitivity to external magnetic field influences.

The channel 2 which is set up in the common mode acceptance reacts significantly more sensitive to an external magnetic field. In the contrary, the channel 1 is set up in the common mode rejection. Said channel 1 is arranged for measuring the torque applied but also has a sensitivity relative to the external magnetic field. However, the sensitivity of the channel 1 relative to the external magnetic field is smaller than the sensitivity of the channel 2 relative to the external magnetic field.

Additional Description

Both channels 1 and 2 comprise at least two coils each. Both channels 1 and 2 have a different sensitivity each. Particularly, the have a different sensitivity each relative to the external magnetic field.

The stress, which is applied to the magnetoelastic body and its associated magnetized zones, is measured by the first channel 1. An electric current is flowing through the at least two coils of the first channel 1. The flow of the electric current through the at least two coils of the first channel 1 is directed in an opposite direction relative to a center tap CT. Thus, leading to an opposite sensitive direction.

As already mentioned, in case there is an external magnetic field influencing the torque sensor and its corresponding channel 1 the effect of the external magnetic field on the channel 1 has to be eliminated. The signal of the channel 1 has to be cleaned because it is distorted by the effect of the external magnetic field on the sensor.

The second channel 2 detects the existence of an external magnetic field affecting the magnetized zones of the magnetoelastic body. The detection of the impact of the external magnetic field by the second channel 2 takes place relative to an electric current flowing through the at least two coils of the second channel 2.

Each coils of the channel 1 (first channel) are connected in a common mode rejection. The flow of the electric current between the two coils towards the center tap CT takes place in an identical direction. Thus, leading to an identical sensitive direction. In other words, the channel 1 is set up as a common mode rejection, whereas the channel 2 shows a common mode acceptance.

The common mode acceptance channel 2 reacts significantly more sensitive to any external magnetic field influence than does the channel 1.

In the case of the channel 1 it is rendered mandatory to choose a different gain setting for the channel 2.

With those and other embodiments, advantages and further features of the invention which may became apparent hereinafter, an example of the invention may be described more specifically by reference to the detailed description of the drawings following below.

DETAILED DESCRIPTION

Figure 1:
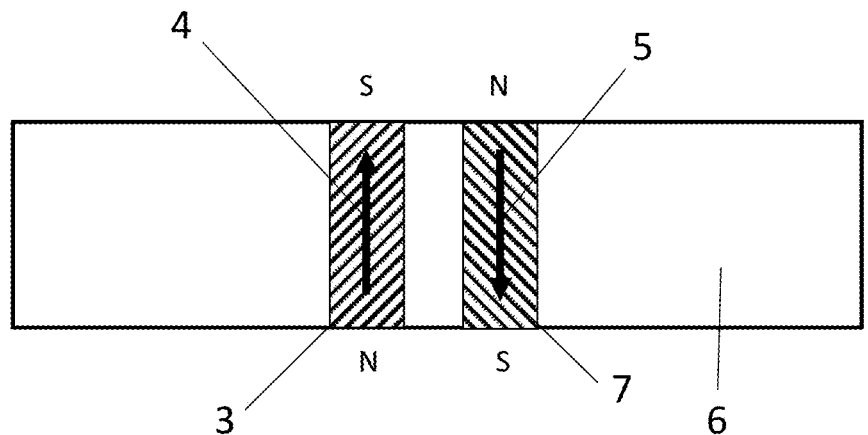
FIG. 1 a side view of a magnetoelastic body showing two magnetic zones according to the state of the art, FIG. 2a a schematic view of a channel 1 of a sensor with corresponding coils as well as connecting drives A and B with the center tap CT, FIG. 2b a schematic view of a channel 2 with corresponding coils as well as connecting drives A and B with the center tap CT.

FIG. 1 shows the magnetoelastic body 6 having two magnetic zones 3, 7.

Each magnetic zone 3, 7 carries a direction of magnetization 4, 5.

Said directions of magnetization 4, 5 are aligned oppositely to each other.

Figure 2A:
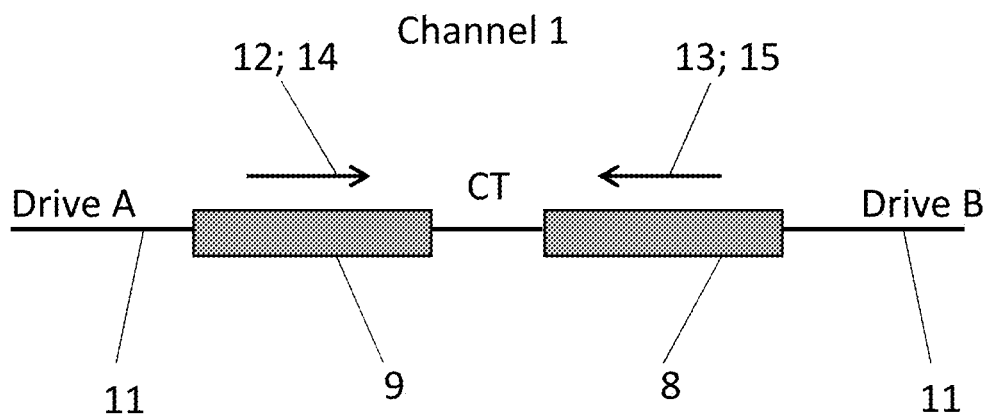

The FIG. 2a shows a channel 1 of a magnetic field sensor 18 in the sense of the present invention. Said channel 1 measures the stress applied to the magnetoelastic body 6.

According to the invention, the sensor 18 shown in FIG. 2a has at least one channel 1.

The sensor 18 comprises at least said channel 1, which has at least two coils 8, 9. The sensor 18 shown in FIG. 2a further comprises at least drives A and B. Drives A and B represent the wiring connecting at least the corresponding coils 8, 9 with said tap (CT) of the channel 1. The sensor 18 also has means for measuring the current flowing from the Drives A and B to the center tap (CT) through the individual coil 8, 9 (not shown).

The sensor 18 is referred to as a magnetic field sensor.

In case, when stress is applied to the magnetoelastic body 6, the current flows in the coils 8, 9 of the channel 1 in opposite directions respectively, i.e. the channel 1 is set in the common mode rejection.

The first channel 1 shown in the FIG. 2a is capable of measuring the stress applied to the magnetized zones 3, 7 (not shown) of the magnetoelastic body 6.

In the FIG. 2a the channel 1 is set in common mode rejection.

Figure 2B:
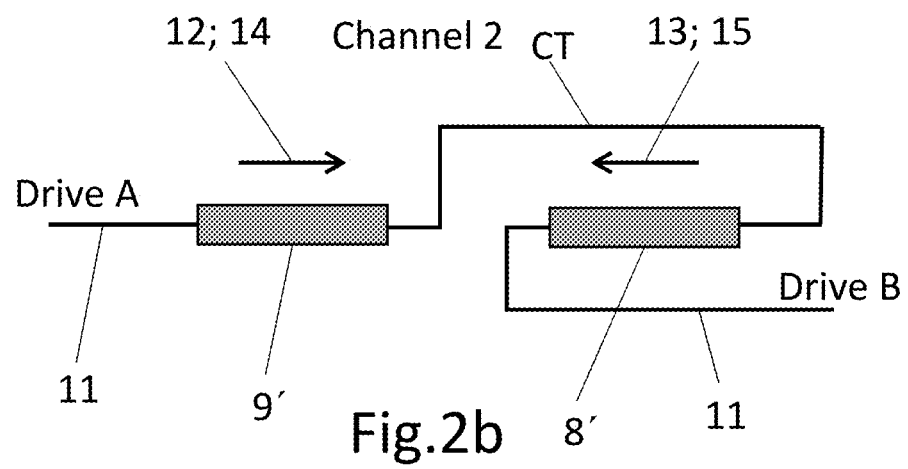

FIG. 2b shows a schematic view of said channel 2 with corresponding coils 8, 9 as well as connecting drives A and B, corresponding to the schematic view shown in FIG. 2a.

However, in the FIG. 2b, channel 2 is shown. The second channel 2 is constructed in a way to detect the effect of the external magnetic field to the magnetoelastic sensor. Here, the current 12, 13, 14, 15 flows through said coils 8, 9 in an identical direction to the center tap (CT). This leads to an identical sensitive direction.

In other words, when an external magnetic field is detected by channel 2, which affects the magnetoelastic sensor 18, the current flow 12, 13, 14, 15 in the coils 8, 9 of the channels 2 in the same directions respectively. Thus, the channel 2 is set in common mode acceptance.

To flip the polarity of the coils 8, 9 to reverse the direction of the flow 12, 13, 14, 15 of the current within the coil 8, 9, in the FIGS. 2a and 2b the center tap CT needs to be adapted to the amended direction of the flow 12, 13, 14, 15 of the current. Thus, when the flow of the current in the relevant coil 8, 9 is reversed the measurement direction in the individual coil 8, 9 is reversed as well.

Figure 3:
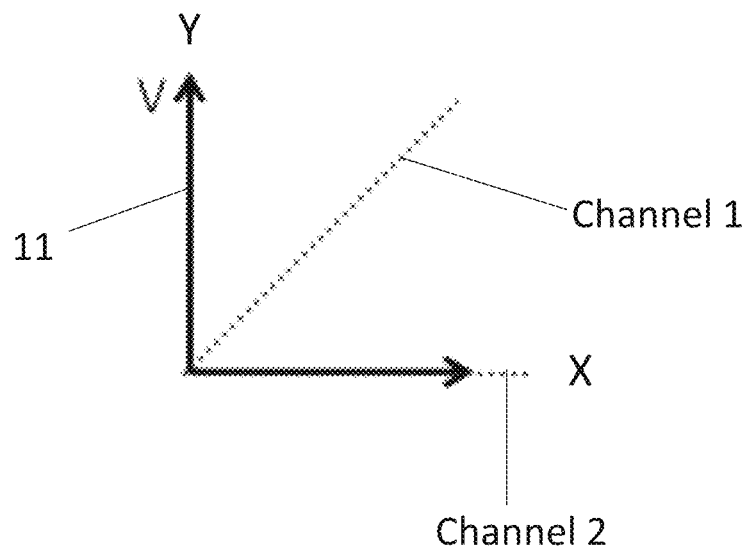
FIG. 3 shows the influence of the stress on both the channel 1 and the channel 2, FIG. 4 a diagram showing the influence of an external magnetic field to the channel 1 and the channel 2.
Figure 4:
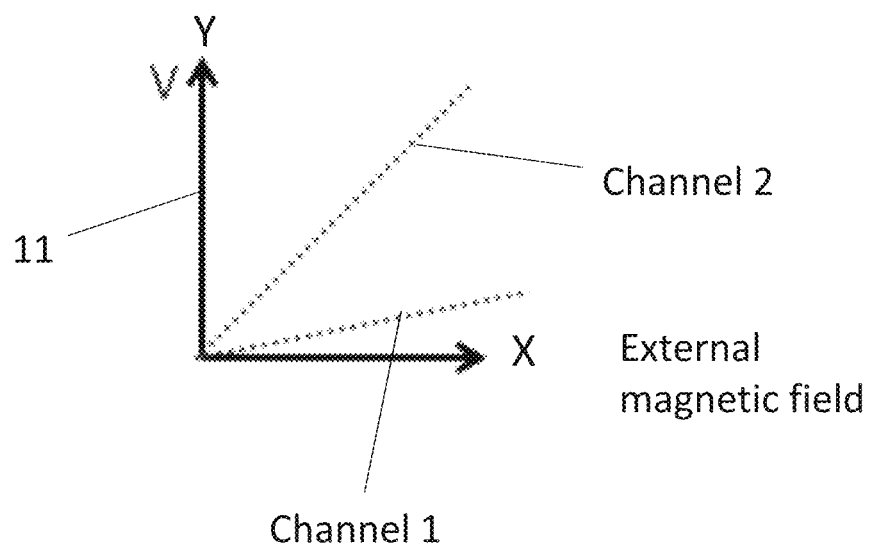

Both the FIG. 3 and the FIG. 4 show a Cartesian coordinate system. On the Y-axis of both the FIG. 3 and the FIG. 4 the output voltage V is found.

In the FIG. 3, the channel 1 shows the results of the measurement of the stress applied to the magnetoelastic body 6 relative to the increase of the current flowing through the coil 8, 9.

As the channel 2 only measures the external magnetic field and does not show any sensitivity towards the stress, the channel 2 shown in the FIG. 3 runs in the X-axis.

Contrary to each other, on the X-axis of the FIG. 4 the magnitude of the external magnetic field is shown, whereas values of the stress applied are depicted on the X-axis of the FIG. 3.

In regard to the FIG. 4 the assumption is made that said external magnetic field is arranged at a given distance relative to the coils 8 and 9 of the channel 1 and the channel 2.

FIG. 4 shows the varying values of magnitude of the external magnetic field. Said values being the results of said detecting channel 2. As the values of magnitude of the external magnetic field increase, measured by the channel 2 of the FIG. 4, the impact of the external magnetic field affecting the results of the channel 1 measuring the stress applied to the magnetoelastic body increases as well.

Said results of channel 1 shown in the FIG. 4 represent the values of the external magnetic field sensed by the channel 1, measuring the stress, which is due to the sensitivity of the channel 1 relative to the external magnetic field. The results of the channel 1 shown in FIG. 4 represent the effect of the external magnetic field distorting the results of the channel 1, measuring the stress applied to the magnetoelastic body 6.

The sensitivity of the channel 1 represents the impact of said external magnetic field on the results of the channel 1.

The channel 2 shown in the FIG. 4 represent the values of the external magnetic field detected by the channel 2 as the voltage shown on the Y-axis increases.

The FIG. 5 is a two-part presentation of the magnetoelastic body 6 with its magnetic zones 3, 7 and coils 8, 9 of said channels 1 and channel 2.

On the left, FIG. 5 shows a side view 16 of said magnetoelastic body 6, whereas the right part of the FIG. 5 depicts a front view 17 of said magnetoelastic body 6.

The magnetoelastic body 6 is any appropriate embodiment which is able to receive stress. The magnetoelastic body 6 comprises at least one magnetoelastic active zone 3, 7, which allows the body to receive a stress. The magnetoelastic zones 3, 7 may be an integral and homogeneous part of the magnetoelastic body 6. It may be constructed as a shaft, a cylinder or any appropriate geometric configuration. It may be rotatable. Thus, it is subject to a magnetoelastic effect.

According to the invention there is at least one sensor 18 comprising at least one channel 1, measuring the stress applied to a magnetoelastic body 6 and at least one channel 2 detecting the external magnetic field.

Said sensor 18 comprises at least one first channel 1 and a second channel 2.

In the example shown in the FIG. 5 the channel 1 is measuring the stress and detects to some extend the external magnetic field. The other channel 2 detects the external magnetic field only.

Said channel 1 is set up as a common mode rejection. The channel 2, however is formed in common mode acceptance.

Figure 5A:
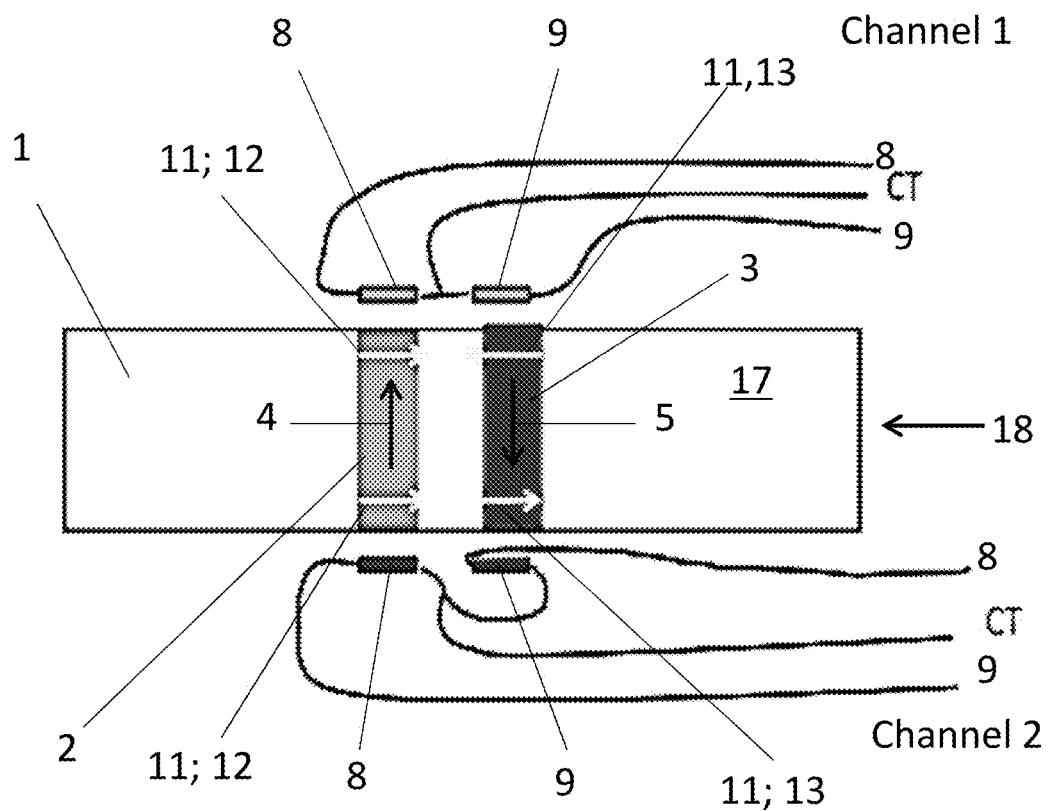
FIG. 5a shows the magnetoelastic body of the sensor in a side view
Figure 5B:
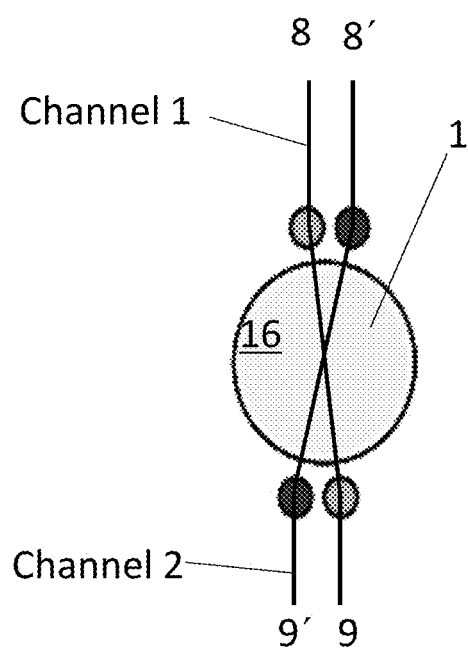
FIG. 5b shows the magnetoelastic body of the sensor in a front view, FIG. 6 a diagram showing a common mode rejection configuration for the sensor for measuring stress and FIG. 7 a diagram showing a common mode acceptance configuration for detecting a potential external magnetic field.

Turning now in detail to the coils and channels according to FIGS. 5a and 5b.

Each magnetic zone 3, 7 of the magnetoelastic body 6 is assigned at least one coil 8, 9 of a sensor 18 measuring the effect of stress applied to the magnetoelastic body 6 and detecting the effect of the external magnetic field to the magnetoelastic body 6.

Since there are at least two magnetic zones 3, 7, also at least two coils 8, 9 are provided each of them being assigned to its corresponding magnetic zone 3, 7.

In the area of the magnetic zones 3, 7 corresponding coils 8, 9 of said channel 1 and said channel 2 are arranged tangentially spaced from said magnetoelastic body 6. The total number of coils in this example is four. In a front view the coils 8, 9 of the channels 1 and 2 are positioned adjacent to each other. They are also positioned axially relative to the magnetoelastic body 6.

The results of this setting in relation to each other are specific signals.

The signals generated by the coils 8, 9 respectively, are further processed by the above mentioned channels 1 and 2.

According to the two sets of magnetic zone-related information, the first channel 1 evaluates a first signal. Likewise the second channel 2 evaluates a second signal.

The coils 8, 9 of the one channel 1 are connected in common mode rejection; the coils of the other channel 2 are connected in common mode acceptance.

This means that the method employs a Dual-band system, of which the magnetic zones 3, 7 are read with at least one channel 1, configured in common mode rejection. The other channel 2 is set in common mode acceptance.

Turning to the side view 16 of the magnetoelastic body 6. The side view 16 of the FIG. 5 shows coils 8, 8' and 9, 9'. Said coils 8' and 9' refer to the channel 2, whereas the coils 8 and 9 refer to the channel 1. Thus, the coils 8 and 9 are positioned for measuring the stress applied to the magnetoelastic body 6.

In the side view of FIG. 5a, the channel 1 and its coils 8, 9 are set in the common mode rejection, whereas the channel 2 and the corresponding coils 8', 9' are set in the common mode acceptance.

Figure 6:
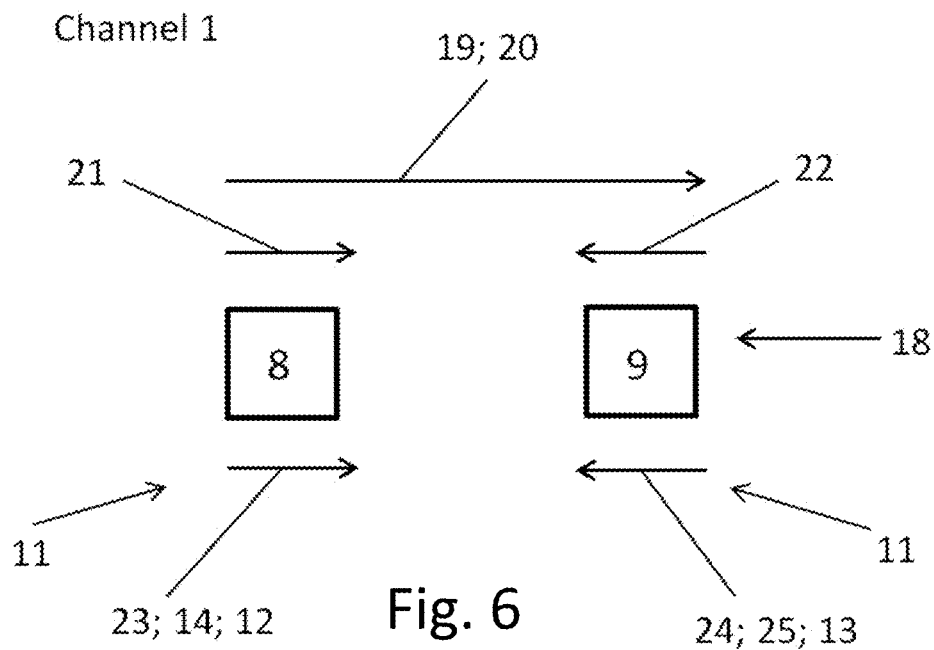
Figure 7:
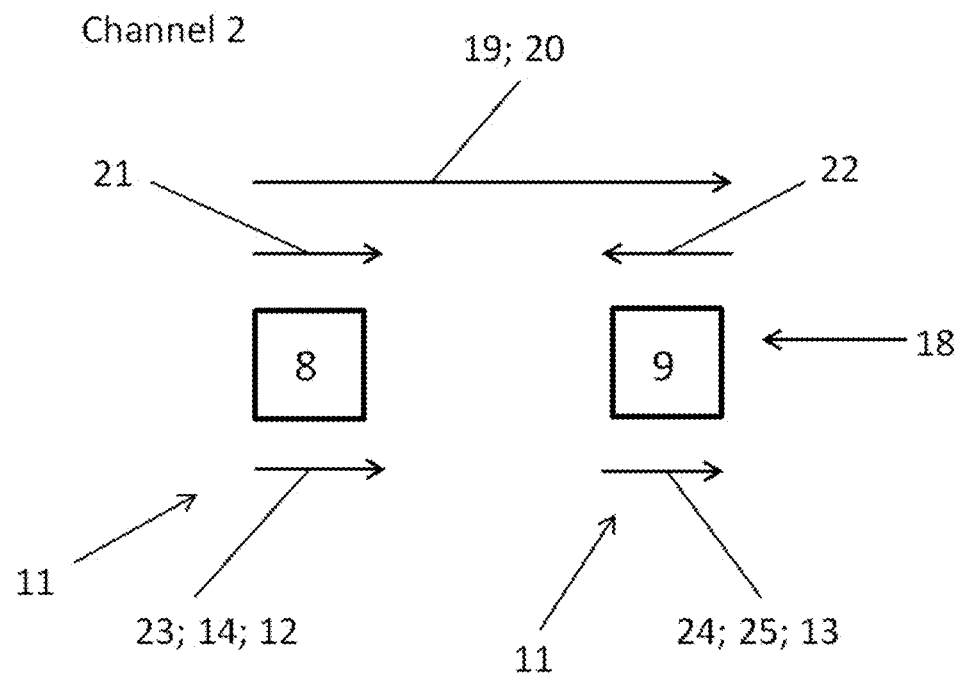

Turning now to the FIGS. 6 and 7, both focusing on the coils 8, 9 of the channels 1 and 2 and on the current 11 as well as on the varying directions 14, 15 of the flows 12, 13 of the current 11 within said coils 8 and 9.

In the common mode rejection configuration of the channel 1, shown in said FIG. 6 said coils 8, 9 are arranged in a common mode rejection.

The presentation of the channel 2 shown in the FIG. 7 represents common mode acceptance connection state of said coils 8, 9.

Turning now to the FIG. 6. The FIG. 6 is a diagram of the coils 8, 9 of the channel 1, operating in the common mode rejection configuration.

Reference 19 and reference 20 indicate the external magnetic field detected by the channel 1 and the channel 2.

References 21 and 22 stand for the stress-induced magnetic fields.

The stress induced magnetic fields 21, 22 are of the same magnitude and opposite direction. This is due to the design and the processing of the magnetic zone 3, 7.

The arrows 23 and 24 show the sensitive direction of the channel 1. Thus, the arrows 23, 24 show directions of the measurement of the magnetic field 19 of channel 1.

In the common mode rejection configuration of channel 1, the arrows 23 and 24 are arranged opposite to each other. In a common mode rejection configuration the following formula is relevant: The result of the measurement of the channel 1 represents the stress induced magnetic field 21, whereas in a common mode acceptance configuration the channel 2 outputs a signal which represents the external magnetic field 20.

The external magnetic field may be comprised of a far field noise source, a near field noise source or even both.

Turning now to FIG. 7 which shows a diagram of the Channel 2 which operates in common mode acceptance.

Said channel 2 detect an external magnetic field, shown by references 19, 20.

The stress induced magnetic field sensed by the channel 2 respectively is indicated by reference numbers 21, 22.

According to the design and the processing of the magnetic zones 3, 7 the stress induced magnetic field 21, 22 of the channel 2 is of equal magnitude and is directed in a opposite manner, relative to each other.

The arrows 23, 24 shown in the FIG. 7 indicate the sensitive direction or the positive direction of the result of the measurement of the channel 2 respectively.

When the channel 2 is operated in common mode acceptance (see FIG. 7), the corresponding coils 8, 9 are oriented in a way that the arrows 24 are leading in the same direction.

In the common mode rejection configuration the channel 1 outputs a signal representing a stress induced magnetic field. The channel 2 outputs a signal, representing the external magnetic field 20.

The measured output of the sensor comprising the channel 1 in common mode rejection=the stress induced magnetic field 21, 22 of one of the magnetic zones 3, 7–the stress induced magnetic field 21, 22 from the other magnetic zone 3, 2+the zone of the external magnetic field 19, 20 detected at both the channel 1 and 2.

While various embodiments have been described above, it should be understood that they have been presented by way of example only, and not limitation. Thus, the breadth and scope of a preferred embodiment should not be limited by any of the above-described exemplary embodiments.

REFERENCE LIST

1 Channel 1
2 Channel 2
3 Magnetic zone
4 Direction of magnetization
5 Direction of magnetization
6 Magnetic elastic body
7 Magnetic zone
8 Coil
8' Coil
9 Coil
9' Coil
CT Tap
11 Current
12 Flow of current
13 Flow of current
14 Direction of flow
15 Direction of flow
16 Side view
17 Front view
18 Sensor
19 External magnetic field
20 External magnetic field
21 Stress induced magnetic field
22 Stress induced magnetic field
23 Arrow
—Sensitive direction
—Positive direction
—Field measurement
24 Arrow
—Sensitive direction
—Positive direction
—Field measurement

What is claimed is:

1. A method for measuring a stress applied to a magneto-elastic body (6) while simultaneously detecting an external magnetic field (19, 20) affecting the magneto-elastic body (6), wherein the method allocates non-stress related influence affected by the external magnetic field (19,20) to the measured stress by utilizing a magneto-elastic sensor (18), the method comprising the steps of:

providing the magnet-elastic sensor (18) with at least two magnetic zones (3,7) of opposite magnetic orientation to each other on the magneto-elastic body (6), and providing magnet-elastic sensor (18) with at least one first channel (1) and at least one second channel (2), wherein the at least one first channel (1) and the at least one second channel (2) each comprise at least two coils (8,9,8',9') with both coils axially aligned, and with each of the coils arranged adjacent to the magnetized zone (3,7) of the magneto-elastic body (6), and the at least one first channel (1) and the at least one second channel (2) have a different sensitivity;

configuring the at least one first channel (1) as a common mode rejection channel;

configuring the at least one second channel (2) as a common mode acceptance channel;

measuring a stress applied to the magnetized zones (3, 7) of the magneto-elastic body (6) by the at least one first channel (1) by reading said magnetized zones (3,7) with the respective at least two coil (8, 9, 8', 9') of the first channel (1) in a direction opposite to a center tap (CT) of the at least one first channel (1);

detecting the impact of the external magnetic field (19, 20) by reading said magnetized zones (3,7) with the respective at least two coil (8, 9, 8', 9') of the at least one second channel (2) in a direction toward the center tap (CT) of the at least one first channel (1); and utilizing the magnetic zones (3, 7) of the magneto-elastic body (6) configured as a dual-band system.

2. A method for measuring a stress applied to a magnetoelastic body (6) while simultaneously detecting an external magnetic field (19, 20) affecting the magnetoelastic body (6), wherein the method allocates non-stress related influence affected by the external magnetic field (19,20) to the measured stress by utilizing a magneto-elastic sensor (18), the method comprising the steps of:

providing the magnet-elastic sensor (18) with at least two magnetic zones (3,7) of opposite magnetic orientation to each other on the magnetoelastic body (6), and providing magnet-elastic sensor (18) with at least one first channel (1) and at least one second channel (2), wherein the at least one first channel (1) and the at least one second channel (2) each comprise at least two coils (8,9,8',9') with both coils axially aligned, and with each of the coils arranged adjacent to the magnetized zone (3,7) of the magnetoelastic body (6), and the at least one first channel (1) and the at least one second channel (2) have a different sensitivity;

configuring the at least one first channel (1) as a common mode rejection channel;

configuring the at least one second channel (2) as a common mode acceptance channel;

measuring a stress applied to the magnetized zones (3, 7) of the magnetoelastic body (6) by the at least one first channel (1) by reading said magnetized zones (3,7) with the respective at least two coil (8, 9, 8', 9') of the first channel (1) in a direction opposite to a center tap (CT) of the at least one first channel (1);

detecting the impact of the external magnetic field (19, 20) by reading said magnetized zones (3,7) with the respective at least two coil (8, 9, 8', 9') of the at least one second channel (2) in a direction toward the center tap (CT) of the at least one first channel (1); and wiring said coils (8, 9, 8', 9') in a diverging manner depending on their arrangement in common mode rejection or in common mode acceptance.

3. A magnetoelastic sensor (18) for measuring a stress applied to a magnetoelastic body (6) while simultaneously detecting an external magnetic field (19, 20) affecting a magnetoelastic sensor (18) and allocating a non-stress related influence affected by the external magnetic field (19, 20) to the measured stress, the magnetoelastic sensor (18) being adapted and configured to interact with the magnetoelastic body wherein the magnetoelastic body has at least two magnetic zones of opposite magnetic orientation to each other, the magnetoelastic sensor (18) comprising at least one first channel (1) and at least one second channel (2), the at least one first channel (1) and the at least one second channel (2) each comprising at least two coils (8,9,8',9'), each of the two coils (8, 9, 8', 9') being axially aligned, the at least two coils (8,9,8',9') being adapted and configured to be arranged adjacent to the magnetized zone (3, 7) of the magnetoelastic body (6), the at least one channel (1) and the at least one second channel (2) each having a sensitivity, the sensitivity of the at least first channel (1) being different from the sensitivity of the at least one second channel (2), the at least one first channel (1) being set up as a common mode rejection channel, the at least one second channel (2) being set up as a common mode acceptance channel, the at least first channel (1) and the at least one second channel (2) being adapted and configured to read said magnetized zones of the magnetoelastic body (6) when stress is applied to the magnetoelastic body (6) and the external magnetic field affects the magnetoelastic sensor (18), the at least two coils (8, 9) of the at least one first channel (1) being adapted and configured to measure electric current flow in a direction opposite to the center tap (CT) of the at least one first channel (1), the at least one second channel (2) being adapted and configured to detect the external magnetic field (19, 20) by electric current flow in the at least two coils (8',9') of the at least one second channel 2 in the direction of the center tap (CT) of the at least one first channel (1), wherein said at least one first channel (1) and said at least one second channel (2) both comprise four coils (8, 9, 8', 9') each.

4. A magnetoelastic sensor (18) for measuring a stress applied to a magnetoelastic body (6) while simultaneously detecting an external magnetic field (19, 20) affecting a magnetoelastic sensor (18) and allocating a non-stress related influence affected by the external magnetic field (19, 20) to the measured stress, the magnetoelastic sensor (18) being adapted and configured to interact with the magnetoelastic body wherein the magnetoelastic body has at least two magnetic zones of opposite magnetic orientation to each other, the magnetoelastic sensor (18) comprising at least one first channel (1) and at least one second channel (2), the at least one first channel (1) and the at least one second channel (2) each comprising at least two coils (8,9,8',9'), each of the two coils (8, 9, 8', 9') being axially aligned, the at least two coils (8,9,8',9') being adapted and configured to be arranged adjacent to the magnetized zone (3, 7) of the magnetoelastic body (6), the at least one channel (1) and the at least one second channel (2) each having a sensitivity, the sensitivity of the at least first channel (1) being different from the sensitivity of the at least one second channel (2), the at least one first channel (1) being set up as a common mode rejection channel, the at least one second channel (2) being set up as a common mode acceptance channel, the at least first channel (1) and the at least one second channel (2) being adapted and configured to read said magnetized zones of the magnetoelastic body (6) when stress is applied to the magnetoelastic body (6) and the external magnetic field affects the magnetoelastic sensor (18), the at least two coils (8, 9) of the at least one first channel (1) being adapted and configured to measure electric current flow in a direction opposite to the center tap (CT) of the at least one first channel (1), the at least one second channel (2) being adapted and configured to detect the external magnetic field (19, 20) by electric current flow in the at least two coils (8",9") of the at least one second channel 2 in the direction of the center tap (CT) of the at least one first channel (1), wherein said at least one first channel (1) and said at least one second channel (2) both having a different sensitivity relative to the external magnetic field (19, 20).

* * * * *